July 12, 1955  J. A. SHAFER  2,712,796
CAR TRUCK DAMPING DEVICE
Filed Nov. 18, 1949  3 Sheets-Sheet 1
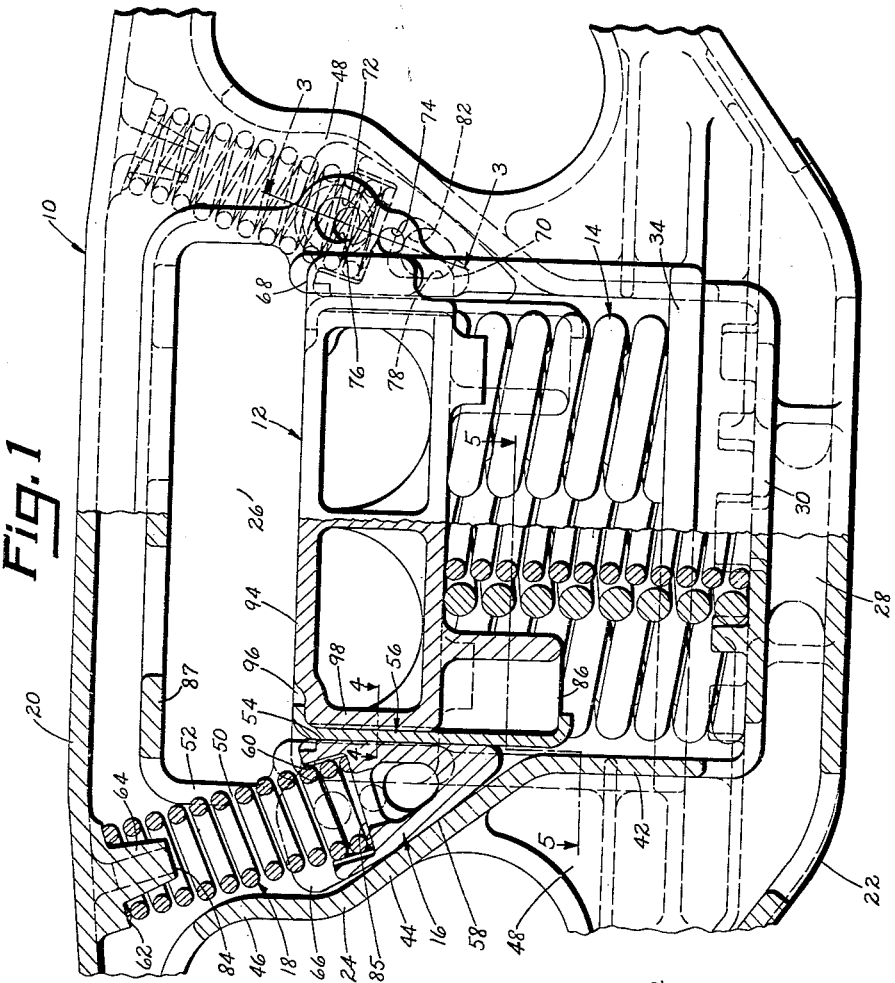
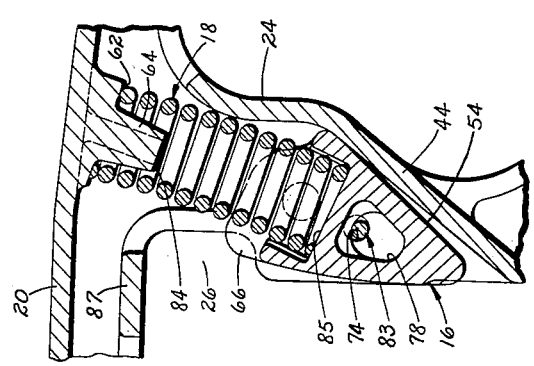
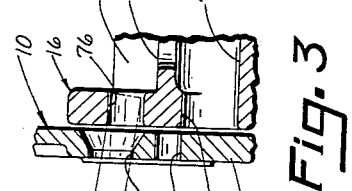
INVENTOR.
JAMES A. SHAFER
BY Albert E. Fiell
ATTORNEY July 12, 1955
J. A. SHAFER
2,712,796
CAR TRUCK DAMPING DEVICE
Filed Nov. 18, 1949
3 Sheets-Sheet 2
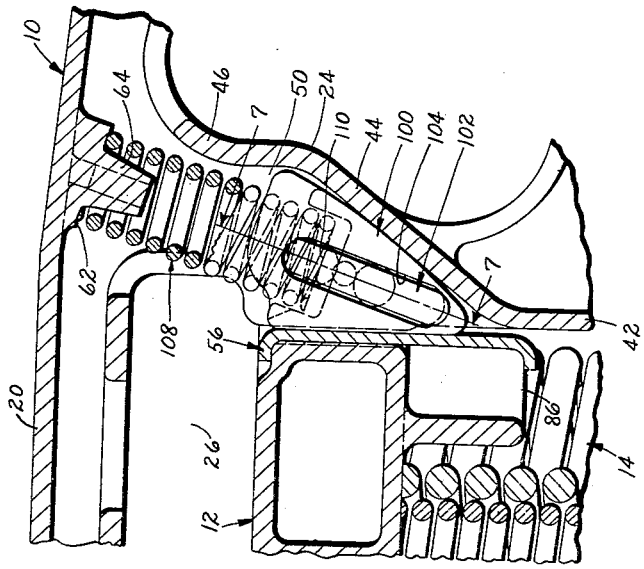
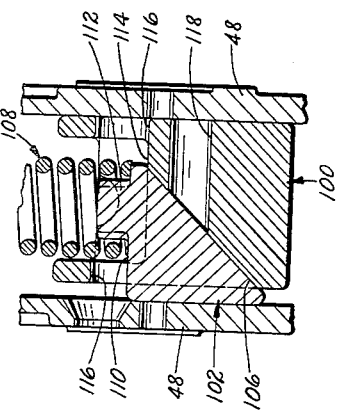
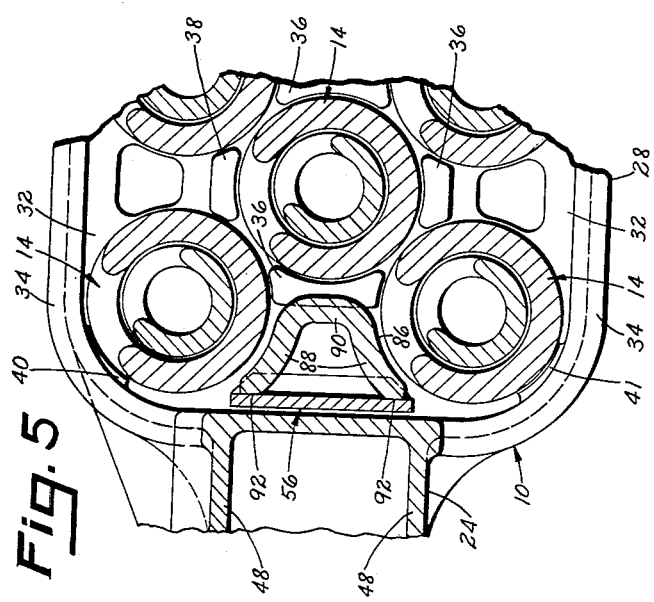
INVENTOR.
JAMES A. SHAFER
BY
ATTORNEY July 12, 1955          J. A. SHAFER          2,712,796
CAR TRUCK DAMPING DEVICE
Filed Nov. 18, 1949                         3 Sheets-Sheet 3
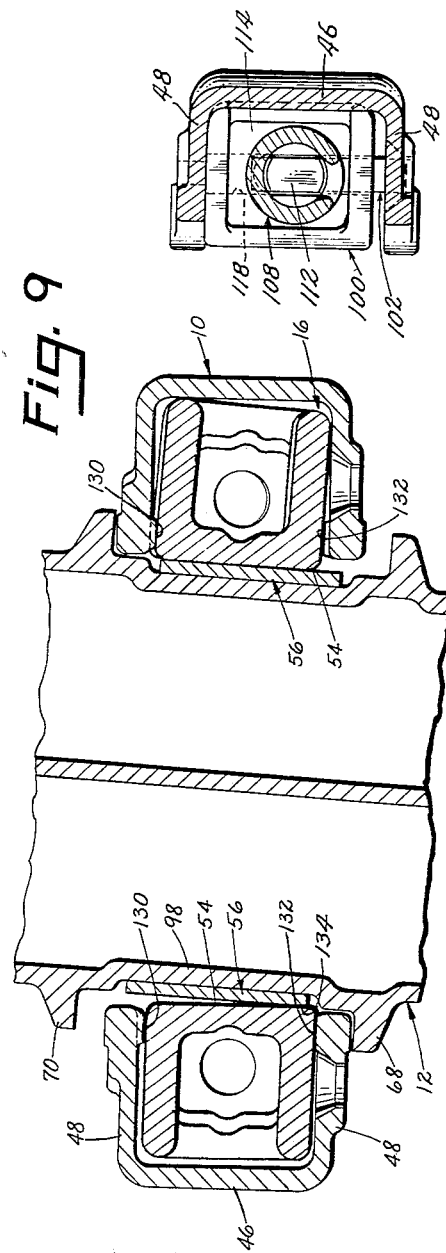
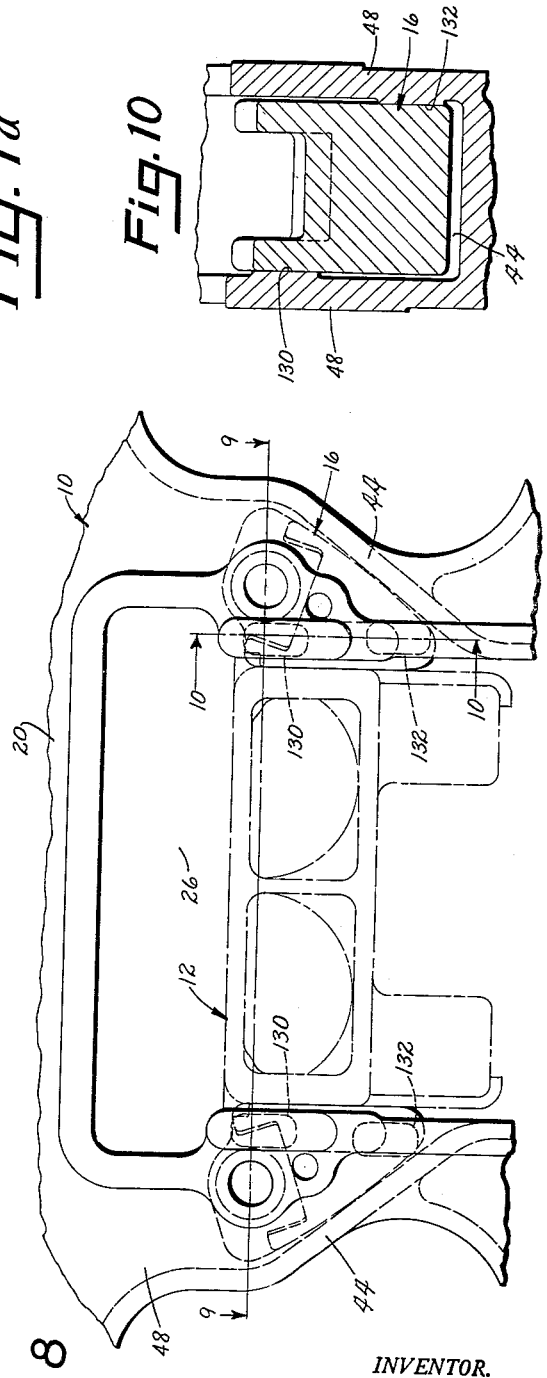
INVENTOR.
JAMES A. SHAFER
BY Albert E. Field
ATTORNEY

United States Patent Office 2,712,796
Patented July 12, 1955

2,712,796

CAR TRUCK DAMPING DEVICE

James A. Shafer, East Cleveland, Ohio, assignor to National Malleable and Steel Castings Company, Cleveland, Ohio, a corporation of Ohio Application November 18, 1949, Serial No. 128,153

8 Claims. (Cl. 105—197)

This invention relates to railway car trucks and more particularly to a truck having a built-in type of friction mechanism for controlling movements of the bolster.

The invention provides various improvements over the construction disclosed in the application of James A. Shafer, Serial No. 756,135, filed June 21, 1947, now Patent No. 2,697,989.

The invention has reference to the type of friction system wherein a friction wedge member is carried in a pocket in a column of the side frame of the car truck and is urged by a spring into engagement with a side of the bolster for controlling the vertical and lateral movements of the bolster with respect to the side frame. A feature of the invention comprises means for so confining the wedge member in the column, that whenever the bolster moves out of squared relation with the side frame, the wedge member acts to return the bolster into squared relation with the frame.

A further feature of the invention resides in the provision of means for preventing incorrect assembly of the friction system parts. Another feature resides in the provision of extensions on the bolster which, in addition to extending the effective friction surface on the sides of the bolster for engagement with the friction wedge member, also serve to position the upper ends of the bolster supporting springs. Other features and advantages of the invention will be set forth in the following description thereof taken in conjunction with the drawings in which:

Fig. 1 is an elevational view partly in section, of a portion of one side of a railway car truck embodying the invention.

Fig. 2 is a fragmentary sectional view illustrating the friction wedge member applied to the column of the side frame in reversed position.

Fig. 3 is a fragmentary sectional view taken along line 3—3 of Fig. 1.

Fig. 4 is a fragmentary sectional view taken along line 4—4 of Fig. 1.

Fig. 5 is a horizontal sectional view taken along line 5—5 of Fig. 1.

Fig. 6 is a sectional view of a modified form of the invention, the friction wedge member and a portion of the spring being shown in full.

Fig. 7 is a fragmentary sectional view taken along line 7—7 of Fig. 6.

Fig. 7a is a top plan view of the form of the invention shown in Fig. 7.

Fig. 8 is an elevational view showing another form of the invention, the bolster being shown in dot-dash.

Fig. 9 is a horizontal sectional view taken along line 9—9 of Fig. 8.

Fig. 10 is a fragmentary sectional view taken along line 10—10 of Fig. 8.

Referring in particular to Fig. 1 of the drawings, the car truck illustrated broadly comprises a side frame 10, a bolster 12, bolster supporting springs 14, and friction wedges 16 which are urged into engagement with the sides of the bolster by springs 18. While only one side frame with its associated bolster end is shown, it will be understood that the other side of the truck has a similar side frame associated with the bolster in like manner.

The side frame comprises a compression member 20, a tension member 22, and spaced columns 24, connecting said members and forming a bolster receiving opening 26 therewith. The tension member has a central portion 28 which is of box section and comprises a top wall 30 which is widened on each side thereof as at 32 to form a spring seat for accommodating coil springs 14. Upstanding flanges 34 which are disposed at the outer edges of the spring seat and are joined to the columns, serve to retain springs 14 on the seat. These flanges also serve to strengthen the spring seating portion of the frame whose section has been reduced in depth to permit the use of long travel springs. The lower end of central spring 14 is positioned by means of upstanding lugs 36 and 38 on the spring seat, while lugs 40 and 41 in conjunction with lugs 36 and 38 serve to position the lower ends of the inboard and outboard springs 14.

Each column 24 comprises a vertical wall 42 which extends upwardly from the top wall 30 of the tension member and continues as an upwardly and outwardly sloping wall 44 which joins with another vertical wall 46. These walls extend transversely into engagement with vertical side walls 48 which merge with the compression and tension members. Pockets 50 for accommodating friction wedges 16 and springs 18 are formed in the upper portion of the columns by walls 44, 46, and 48. Each pocket 50 is open on the inner side of the column as at 52, through which opening wedge 16 and spring 18 are inserted during assembly of the truck.

Each friction wedge 16 has a flat vertical surface 54 for engagement with a wear plate 56 at the side of the bolster. The diagonal surface 58 on the wedge for engagement with sloping wall 44 is preferably crowned or curved in a vertical direction so that when wear takes place between the wedge and the bolster, the wedge will contact wall 44 at the same point on the wedge. The upper end of each wedge 16 is recessed as at 60 to receive the lower end of spring 18. The upper end of spring 18 engages a seat 62 disposed on the under side of compression member 20. A dowel 64 extending from seat 62 into spring 18 serves to position the upper end of the spring and also serves to prevent incorrect assembly of the spring in the column, as will be hereinafter described. Each wedge 16 is provided with a pair of upstanding lugs or ears 66 whose function is to prevent incorrect application of the wedges in the pockets of the columns. In this connection it will be observed that the upper end of the bolster receiving opening 26 is widened to permit withdrawal of the bolster from the side frame during disassembly. Bolster guide lugs 68 and 70 in the assembled truck overlap the outboard and inboard sides 48 of columns 24 below the widened portion of the bolster receiving opening to tie the frame to the bolster. However, when the bolster is raised to the widened end of the bolster receiving opening 26, lugs 68 can be passed through this widened end and the frame withdrawn from the end of the bolster. Lugs 70 do not need to be passed through the bolster receiving opening and preferably extend the full depth of the bolster, thus providing a substantial bearing surface for engagement with the columns. If wedge 16 is accidentally inserted into the column in reversed position, the ends of ears 66 will extend into the widened portion of opening 26. This will prevent assembly of the bolster with side frame by precluding guide lugs 68 from passing through the widened upper end of the bolster receiving opening, as is apparent in Fig. 2.

To facilitate assembly and disassembly of the side frame and bolster, provision is made for the retraction of friction wedges 16 into the columns and out of engagement with wear plate 56. To this end, each column is provided with an opening 72 in the outboard side wall 48 and aligned openings 74 in the outboard and inboard walls 48. Each friction wedge is provided with aligned openings 76 in the upper end thereof and an opening 78. The relative locations of these openings when the wedge is in functioning position may be seen in the right hand column of Fig. 1 and in the sectional view of Fig. 3. To retract the friction wedge, a suitable tool such as a pinch bar 80 may be inserted into openings 72 and 76 as may be seen in Fig. 3 and the wedge retracted until the inner flange portion 82 of opening 78 in the wedge has been raised sufficiently to permit the insertion of a pin into openings 74 and 78 to maintain the wedge in retracted position. With the friction wedge in retracted position, no portion of the wedge will extend into the widened end of the bolster receiving opening and therefore the wedge will in no way interfere with disassembly or assembly of the side frame and bolster. It will be observed that opening 72 is flared on the inner side of wall 48 to facilitate insertion of the pinch bar 80 into the column and wedge.

In Fig. 2 wherein the wedge has been incorrectly applied, the pin 83 has been inserted through opening 74 in the column and 78 in the wedge to hold the latter in retracted position. It will be understood that when the shoe is correctly applied it is held in retracted position by pin 83 in like manner.

In order to prevent incorrect positioning of spring 18 in the column, dowel 64 has been made of such length that the end surface 84 thereof is spaced from the spring seat portion 85 in the friction wedge a distance which is less than the solid height of the spring. This will preclude the upper end of spring 18 from being accidentally hung up on the end of dowel 64 during assembly of the wedge and spring in the column, as it would not be possible to retract the shoe an amount sufficient to permit insertion of the retaining pin into openings 74 in the column and openings 78 in the wedge. Also a transverse tie web 87 is spaced from dowel 64 a distance less than the diameter of spring 18 to preclude accidental insertion of the upper end of the spring between the dowel and web 87.

The bolster is provided with downward extensions 86 positioned adjacent the side frame columns and extending between the inboard and outboard bolster supporting springs 14. These extensions serve the dual function of providing a support for the lower end of wear plate 56 and of positioning the upper end of the inboard and outboard bolster supporting springs. It will be observed that projections 86 are formed with portions 88 which are curved to correspond with the adjacent springs 14. The inner ends of portions 88 are joined by a transverse portion 90, while the outer ends of portion 88 are provided with transversely extending vertical surfaces 92 for engagement with wear plate 56. The wear plate may be suitably secured to the bolster and projection 86 as by means of welding. This arrangement permits the use of a wear plate which extends a considerable distance below bottom wall of the bolster and thereby serves to maintain the wedge stable during the vertical movements of the bolster in service.

The outer edge of top wall 94 of the bolster is depressed as at 96 so that the curved upper end of wear plate 56 is flush with the top surface of the bolster. Also side wall 98 of the bolster is offset in the region of the column so that the outer side of wear plate 56 is in line with the side of the bolster.

In the form of the invention shown in Figs. 6, 7 and 7a, the bolster and side frame are identical with those shown in the previous embodiment. The friction wedge 100 contained in the column of the frame is of the same general shape as the wedge 16 of the previous embodiment, but has associated therewith an auxiliary wedge 102 which serves to preclude swivelling of wedge 100 in the column during angling of the bolster with respect to the side frame in service. Wedge 100 is provided with a transverse opening 104 for receiving auxiliary wedge 102. This opening is provided with a transversely sloping wedge surface 106 for engagement with wedge 102. Wedge 102, which is generally triangular in shape, is wedged between surface 106 on wedge 100 and vertical side wall 48 on the column by a spring 108 which bears against the spring seat portion 110. It will be understood that the upper end of spring 108 engages the spring seat 62 in the same manner as in the previous embodiment. A dowel 112 serves to maintain the lower end of spring 108 on spring seat portion 110.

It will be noted that the lower end of spring 108 bears against auxiliary wedge 102 only and serves to wedge the friction wedge 100 against the side wall 48 of the column as well as to urge wedge 100 downwardly into engagement with the side of the bolster. Thus in service as the bolster angles horizontally relative to the side frame, wedge 100 is prevented from swivelling in the pocket in the column and must therefore move upwardly in the pocket. The increased compression applied to spring 108 as the wedge moves upwards along sloping wall 44 acts to return the bolster into squared relation with the side frame.

The upper end of friction wedge 100 is recessed in the same manner as wedge 16 of the previous embodiment so that if desired, auxiliary wedge 102 may be removed and the spring 108 made to bear against the surface 114 in the recessed portion of wedge 100.

Wedge 100 is adapted to be retracted in the column to facilitate assembly and disassembly of the side frame and bolster in the same manner as wedge 16 of the previous embodiment. Openings 116 and 118 are accordingly provided in wedge 100.

In Figs. 8, 9, and 10, a further modification of the invention is shown in which swivelling of wedge 16 in one direction transversely of the side frame is precluded. In this modification, pairs of lugs 130 and 132 are provided on the inner side of the inboard and outboard side walls 48 of the column. Each column is provided with one pair of lugs 130 and 132 on diagonally opposite sides of walls 48. Thus, as may be seen in Fig. 10, enough clearance is provided so that wedge 16 may be swivelled a limited amount in a clockwise direction but is prevented from swivelling in a counterclockwise direction by lugs 130 and 132. Considering the wedge 16 on the left side of Fig. 8, it will be apparent that it may swivel a limited amount toward the front wall 48 of the side frame column in the same manner as wedge 16 on the right. Also, the wedge on the left is precluded from swivelling in the opposite direction or toward back wall 48 of the column in the same manner as the wedge on the right. The relation of the friction wedges 16 to the bolster when the latter is angled horizontally in respect to the side frame, is shown in Fig. 9. It will be seen in this view that the wedge in the column at the left side of the frame is prevented from swivelling by lugs 130 and 132 as evidenced by the engagement of wear plate 56 with the outer edge of surface 54 of the wedge, as at 134. However, the wedge in the right side of this view is swivelled and its vertical surface 54 remains in engagement with the wear plate of the bolster. The reason for this is that when the bolster angles horizontally relative to the side frame, the wedges tend to remain in full contact with the sides of the bolster and with the sloping wall 44 on the column, and in order to do so they must swivel in opposite directions relative to the side frame. Thus, referring to the wedge 16 on the left side of Fig. 9, in order that it remain in contact with wear plate 56 on the bolster and wall 44 on the column, it must swivel toward back wall 48 of the column. However, lugs 130 and 132 preclude such movement of this wedge so that it remains square in relation to the side frame. At the same time the wedge 16 on the right, in order to remain fully engaged with wear plate 56 and wall 44, swivels towards front wall 48 of the column and it is not limited in this movement by lugs 130 and 132. When the bolster is angled in the opposite direction to that shown in Fig. 9, the friction wedges will function in reverse. Furthermore, in considering the entire car truck, one pair of diagonally opposite friction wedges will act together on the bolster, that is, one diagonally opposite pair of wedges will swivel as the bolster angles in respect to the side frames but the other pair of diagonally opposite wedges will remain stationary. In response to movement of the bolster into out-of-square relation to the side frames at least one of the wedges in each side frame is necessarily forced upwardly along the sloping wall of the column to further compress spring 18 (Fig. 1). This sets up a restoring force against the bolster which acts to return the same into squared relation with the side frames.

The terms and expressions which I have employed are used in a descriptive and not a limiting sense, and I have no intention of excluding such equivalents of the invention described, or of portions thereof, as fall within the purview of the claims.

What I claim is:

1. In a railway car truck a side frame comprising a compression member, a tension member and spaced columns forming with said members a bolster receiving opening having a widened upper portion, a bolster extending into said opening, springs in said opening resting on said tension member for supporting said bolster, said bolster having guide lugs for overlapping the outboard side of said columns below said widened portion of said opening, said lugs being adapted upon raising said bolster into the widened end of said opening to be passed through said widened end to permit disassembly of said side frame and said bolster, each of said columns having a pocket for receiving a friction wedge member, and a substantially symmetrical wedge member in said pocket comprising a flat vertical surface for engagement with a side of said bolster, and a diagonally disposed curved surface for engagement with a sloping wall of said pocket, said wedge member having an ear at the upper end thereof which is disposed adjacent said curved surface and is adapted to extend into the widened portion of said bolster opening in the event the wedge member is incorrectly applied in said pocket during assembly of said truck and thereby preclude passage of said lugs through said widened end of said bolster opening.

2. A railway car truck comprising a side frame having tension and compression members, columns extending between said members and forming therewith a bolster receiving opening having a widened upper portion, a bolster extending into said opening, springs on said tension member supporting said bolster, said bolster having a pair of lugs overlapping the outboard side of said columns below said upper portion of said opening, said lugs being so constructed and arranged as to enable passage thereof through said widened upper portion of said opening when said bolster is raised for assembly or disassembly with said side frame, said columns having pockets with transverse surfaces sloped upwardly and away from said bolster, and a substantially symmetrical friction wedge member in each pocket having a pair of converging faces engaging said transverse surface of the pocket and the side of said bolster, said face in engagement with said bolster being flat and said face in engagement with said surface in said pocket being curved vertically, said wedge member having means thereon for precluding incorrect assembly of said truck, said means comprising a lug at the upper end of said wedge member having a portion disposed adjacent said transverse surface, said lug portion being adapted to extend into said widened portion of said opening in the event said wedge member is applied in said pocket with said flat face in engagement with said sloping surface therein, said last named lug when so disposed in said widened portion of said opening precluding said first named bolster lugs from being passed therethrough.

3. In a car truck a side frame having a compression member, a tension member and spaced columns forming a bolster receiving opening therewith, the spacing of said columns being greater in the upper end of said opening, a bolster extending into said opening and being resiliently supported on said side frame, said bolster having vertical side surfaces facing said columns, a pair of lugs on said bolster for overlapping one side of said columns when said bolster is below said upper end of said opening, said lugs being adapted to be passed through said upper end of said opening and clear the adjacent side frame column when said bolster is raised for removal of said side frame, a pocket in each of said columns having a transverse wall sloping upwardly and away from said side surface of said bolster, and a friction member in each of said pockets, each of said friction members having a vertically curved surface engaging said wall in said pocket and a flat surface engaging said side surface of said bolster, each of said friction members having at its upper end a projecting portion at one side thereof extending from said curved surface toward said flat surface, said portion being adapted to extend into said upper end of said opening when said member is incorrectly applied in said pocket with said curved surface thereof facing said side of said bolster, thereby precluding passage of said bolster lugs through the upper end of said opening and preventing assembly of said bolster and side frame.

4. A friction wedge for a railway car truck, said wedge comprising a pair of converging faces, one of said faces being curved vertically and engageable with a sloping wall on the column of an associated side frame, the other of said faces being flat and engageable with the side of an associated bolster of said truck, a spring seat in the upper end of said wedge, and lugs at the sides of said wedge extending from said curved face toward said flat face, said lugs extending upwardly beyond the upper extremities of said faces, the portions of said lugs adjacent said curved face being adapted to be engaged by a portion of said bolster to preclude assembly of the latter with said side frame in the event said wedge is incorrectly applied to said side frame with said flat face in engagement with said sloping wall of said column.

5. In a railway car truck a side frame having a compression member, a tension member and spaced columns forming a bolster receiving opening therewith, a bolster extending into said opening, and friction means carried by said side frame, said means comprising a wedge member mounted in a pocket in each of said columns, said wedge member normally having a face in engagement with said bolster, a spring reacting between said wedge member and a seat portion on the underside of said compression member, said wedge member and said associated column having aligned openings for receiving an implement for maintaining said wedge member retracted in said pocket during assembly of said side frame and bolster, and a projection extending downwardly from said seat portion into said spring, said projection being of such downward extent that the distance from the end thereof to the spring engaged portion of said wedge member when the latter is in retracted position is less than the fully compressed length of said spring.

6. In a railway car truck a side frame comprising a compression member, a tension member and spaced columns forming with said members a bolster-receiving opening, a bolster having an end extending into said opening and having a pair of guide lugs extending laterally therefrom and overlapping said columns in all operative positions of said bolster, said bolster opening having a widened portion for reception of said lugs during assembly of said bolster and side frame, each of said columns having a pocket facing a side of said bolster for receiving a friction wedge member, said pocket having a transverse wall sloping in a longitudinal direction, and a wedge-shaped member in said pocket comprising a flat surface for engagement with a side of said bolster and a curved surface for engagement with said sloping wall, said wedge member having an ear which forms an extension of a side thereof, a portion of said ear commencing adjacent said curved surface and being adapted to extend into the widened portion of said bolster opening in the event said member is incorrectly applied in said pocket with said flat surface in engagement with said sloping wall, said ear portion when disposed in said widened portion of said bolster opening precluding passage of said lugs through said opening during assembly of said bolster and side frame.

7. A friction wedge for a railway car truck, said wedge comprising a pair of converging faces, one of said faces being curved vertically and engageable with a sloping wall on the column of an associated side frame, the other of said faces being flat and engageable with the vertical side of an associated bolster of said truck, a spring seat disposed between said faces and an ear disposed between said faces, said ear extending above said seat and forming an extension of a side of said wedge, said ear being so arranged as to engage a guide lug on an associated bolster to preclude assembly of said bolster and side frame in the event said wedge is incorrectly applied to said side frame with said flat face in engagement with said sloping wall of said column.

8. A friction wedge for a railway car truck, said wedge comprising a pair of converging faces, one of said faces being curved vertically and engageable with a sloping wall on the column of an associated side frame, the other of said faces being flat and engageable with the side of an associated bolster of said truck, a spring seat recessed into the upper end of said wedge, and a lug at the upper end of said wedge adjacent said curved face for precluding assembly of said bolster and side frame in the event said wedge is incorrectly applied to said side frame with said flat face in engagement with said sloping wall of the column, said lug forming a continuation of a side of said wedge and extending upwardly beyond the upper extremities of said faces.

References Cited in the file of this patent
UNITED STATES PATENTS

| Number | Name | Date |
|---|---|---|
| 2,222,478 | Cottrell | Nov. 19, 1940 |
| 2,394,547 | Hickman | Feb. 12, 1946 |
| 2,403,045 | Buckwalter | July 2, 1946 |
| 2,434,583 | Pierce | Jan. 13, 1948 |
| 2,458,210 | Schlegel | Jan. 4, 1949 |
| 2,481,475 | Lehrman | Sept. 6, 1949 |
| 2,512,829 | Cottrell | June 27, 1950 |
| 2,545,591 | Shaw | Mar. 20, 1951 |